United States Patent
Kelleher et al.

(10) Patent No.: US 10,737,806 B2
(45) Date of Patent: Aug. 11, 2020

(54) SOLAR ARRAY DEPLOYMENT

(71) Applicant: Aerojet Rocketdyne, Inc., Sacramento, CA (US)

(72) Inventors: Kevin Kelleher, Redmond, WA (US); Dennis Morris, Newbury Park, CA (US); Rodney Noble, Lancaster, CA (US)

(73) Assignee: AEROJET ROCKETDYNE, INC., Redmond, WA (US)

( * ) Notice: Subject to any disclaimer, the term of this patent is extended or adjusted under 35 U.S.C. 154(b) by 405 days.

(21) Appl. No.: 15/762,711

(22) PCT Filed: Sep. 14, 2016

(86) PCT No.: PCT/US2016/051567
§ 371 (c)(1),
(2) Date: Mar. 23, 2018

(87) PCT Pub. No.: WO2017/062140
PCT Pub. Date: Apr. 13, 2017

(65) Prior Publication Data
US 2018/0354657 A1   Dec. 13, 2018

Related U.S. Application Data

(60) Provisional application No. 62/239,167, filed on Oct. 8, 2015.

(51) Int. Cl.
*B64G 1/00* (2006.01)
*B64G 1/22* (2006.01)
(Continued)

(52) U.S. Cl.
CPC ............. *B64G 1/222* (2013.01); *B64G 1/007* (2013.01); *B64G 1/242* (2013.01); *B64G 1/405* (2013.01);
(Continued)

(58) Field of Classification Search
CPC ........ B64G 1/222; B64G 1/007; B64G 1/242; B64G 1/405; B64G 1/409; B64G 1/425; B64G 1/443; H02S 10/40; H02S 40/38
See application file for complete search history.

(56) References Cited

U.S. PATENT DOCUMENTS

| | | | | |
|---|---|---|---|---|
| 6,147,294 A | * | 11/2000 | Dailey | B64G 1/222 136/245 |
| 2014/0061386 A1 | * | 3/2014 | Peterka, III | B64G 1/10 244/171.5 |

FOREIGN PATENT DOCUMENTS

| EP | 0064917 | 11/1982 |
|---|---|---|
| EP | 0754625 | 1/1997 |

OTHER PUBLICATIONS

International Search Report for International Application No. PCT2016051567 completed Dec. 9, 2016.

(Continued)

*Primary Examiner* — Justin M Benedik
(74) *Attorney, Agent, or Firm* — Joel G. Landau

(57) ABSTRACT

A method for solar array (28a, 28b) deployment includes deploying a first portion of solar cells of a solar array responsive to a first drag condition, charging a battery (26) with the first portion of solar cells, activating an electric thruster (24) at a first power level using the first portion of solar cells, deploying a second portion of solar cells of the solar array responsive to a second drag condition that is lower than the first drag condition, and activating the electric thruster at a second power level that is higher than the first power level using the first portion of solar cells and the second portion of solar cells.

16 Claims, 3 Drawing Sheets

(51) Int. Cl.
*B64G 1/42* (2006.01)
*B64G 1/40* (2006.01)
*H02S 10/40* (2014.01)
*H02S 40/38* (2014.01)
*B64G 1/24* (2006.01)
*B64G 1/44* (2006.01)
*H02J 7/35* (2006.01)

(52) U.S. Cl.
CPC .............. *B64G 1/409* (2013.01); *B64G 1/425* (2013.01); *B64G 1/443* (2013.01); *H02J 7/35* (2013.01); *H02S 10/40* (2014.12); *H02S 40/38* (2014.12)

(56) References Cited

OTHER PUBLICATIONS

International Preliminary Report on Patentability for PCT Application No. PCT/US2016/051567, dated Apr. 19, 2018.

\* cited by examiner

SOLAR ARRAY DEPLOYMENT

CROSS-REFERENCE TO RELATED APPLICATIONS

The present disclosure claims priority to U.S. Provisional Patent Application No. 62/239,167, filed Oct. 8, 2015.

BACKGROUND

Space vehicles, such as satellites, may include a solar array for generating power for propulsion and onboard components. A solar array is typically stowed during launch of the space vehicle and is later deployed to a relatively large surface area of solar cells for power generation.

SUMMARY

A method for solar array deployment according to an example of the present disclosure includes deploying a first portion of solar cells of a solar array responsive to a first drag condition, charging a battery with the first portion of solar cells, activating an electric thruster at a first power level using the first portion of solar cells, and deploying a second portion of solar cells of the solar array responsive to a second drag condition. The second drag condition is lower than the first drag condition. The electric thruster is then activated at a second power level using the first portion of solar cells and the second portion of solar cells. The second power level is higher than the first power level.

A further embodiment of any of the foregoing embodiments includes raising an orbit of a vehicle attached to the solar array using the electric thruster, and the deploying of the second portion of solar cells is after the raising.

In a further embodiment of any of the foregoing embodiments, the first drag condition is at a first altitude and the second drag condition is at a second, higher altitude.

In a further embodiment of any of the foregoing embodiments, the deploying of the first portion of solar cells and the deploying of the second portion of solar cells include unfolding the solar array.

In a further embodiment of any of the foregoing embodiments, the deploying of the first portion of solar cells includes unrolling the solar array.

A vehicle with a solar array according to an example of the present disclosure includes a vehicle body that has an electric thruster and a battery operable to activate the electric thruster to produce thrust. A solar array is attached to the vehicle body, and a controller is configured to deploy a first portion of solar cells of the solar array responsive to a first drag condition to charge the battery with the first portion of solar cells, activate the electric thruster at a first power level using the first portion of solar cells, deploy a second portion of solar cells of the solar array responsive to a second drag condition that is lower than the first drag condition, and activate the electric thruster at a second power level using the first portion of solar cells and the second portion of solar cells. The second power level is higher than the first power level.

In a further embodiment of any of the foregoing embodiments, the controller is configured to raise an orbit of the vehicle body using the electric thruster and then deploy the second portion of solar cells.

In a further embodiment of any of the foregoing embodiments, the first drag condition is at a first altitude and the second drag condition is at a second, higher altitude.

In a further embodiment of any of the foregoing embodiments, the solar array is moveable between stowed and deployed positions. The solar array is rolled in the stowed position.

In a further embodiment of any of the foregoing embodiments, the vehicle body is a satellite.

In a further embodiment of any of the foregoing embodiments, the controller is mounted in the vehicle body.

In a further embodiment of any of the foregoing embodiments, the first portion of solar cells deploys by unrolling.

A method for solar array deployment according to an example of the present disclosure includes deploying a first portion of solar cells of a solar array, charging a battery with the first portion of solar cells, activating an electric thruster at a first power level using the first portion of solar cells, raising an orbit of a vehicle attached to the solar array, deploying a second portion of solar cells of the solar array after raising the orbit of the vehicle, and activating the electric thruster at a second power level using the first portion of solar cells and the second portion of solar cells. The second power level is higher than the first power level.

In a further embodiment of any of the foregoing embodiments, the deploying of the first portion of solar cells is responsive to a first drag condition and the deploying of the second portion of solar cells is responsive to a second, lower drag condition.

In a further embodiment of any of the foregoing embodiments, the deploying of the first portion of solar cells and the deploying of the second portion of solar cells includes unfolding the solar array.

In a further embodiment of any of the foregoing embodiments, the deploying of the first portion of solar cells includes unrolling the solar array.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
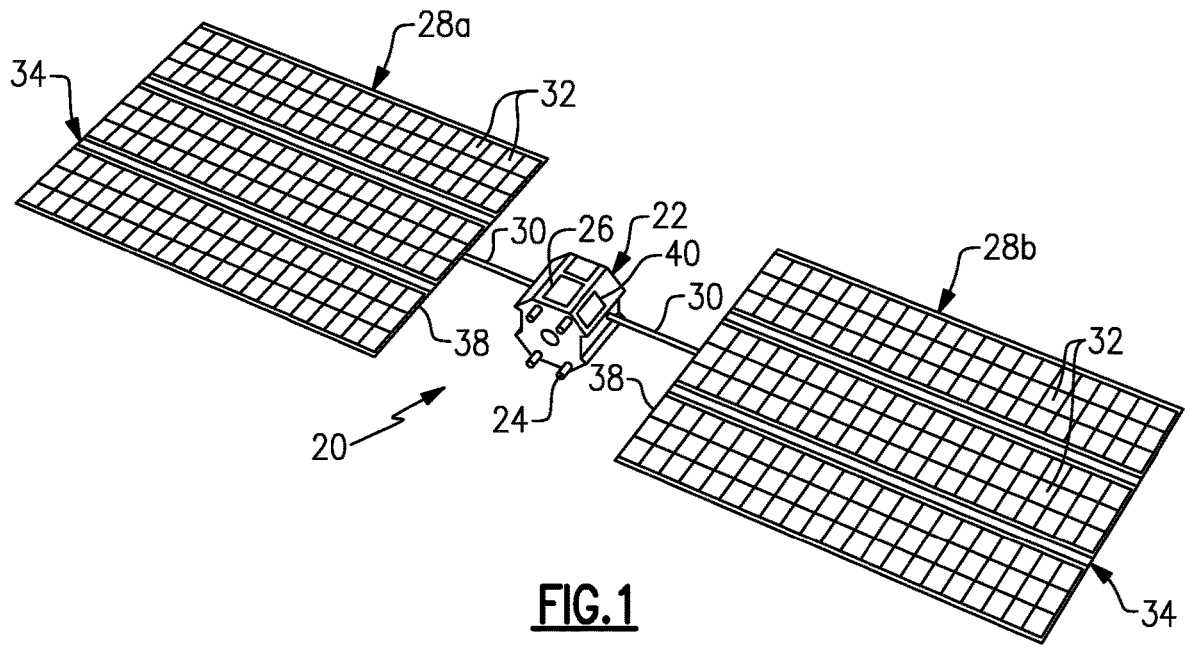
FIG. 1 illustrates an example vehicle with one or more solar arrays and solar cells.

FIG. 1 schematically illustrates an example vehicle 20. In this example, the vehicle 20 is a satellite; however, it is to be understood that this disclosure is also applicable to other types of vehicles and space vehicles. As will be described, the vehicle 20 is operable to selectively deploy a solar array to reduce power requirements.

In the illustrated example the vehicle 20 includes a vehicle body 22 with one or more electric thrusters 24. For example, the electric thruster or thrusters 24 are Hall Effect thrusters. Hall Effect thrusters may be characterized by low thrust and high efficiency compared to chemical thrusters. In practice an electric thruster can be used for a variety of purposes, including attitude control, station-keeping, and orbit raising to a final orbital position after separation from a launch vehicle.

A battery 26 is located in the vehicle body 22 and may be operable to activate the electric thruster or thrusters 24 to produce thrust; alternatively, the thrusters 24 may receive power directly from solar arrays 28a/28b without the use of an intermediate battery. The solar arrays 28a/28b are attached via arms 30 to the vehicle body 22. Each arm 30 is extendable/retractable from the vehicle body 22 between stowed and deployed positions. Additionally or alternatively, the arms 30 may have telescoping features or other configurations that permit the arms 30 to extend and retract the solar arrays 28a/28b with respect to the vehicle body 22.

Figure 2:
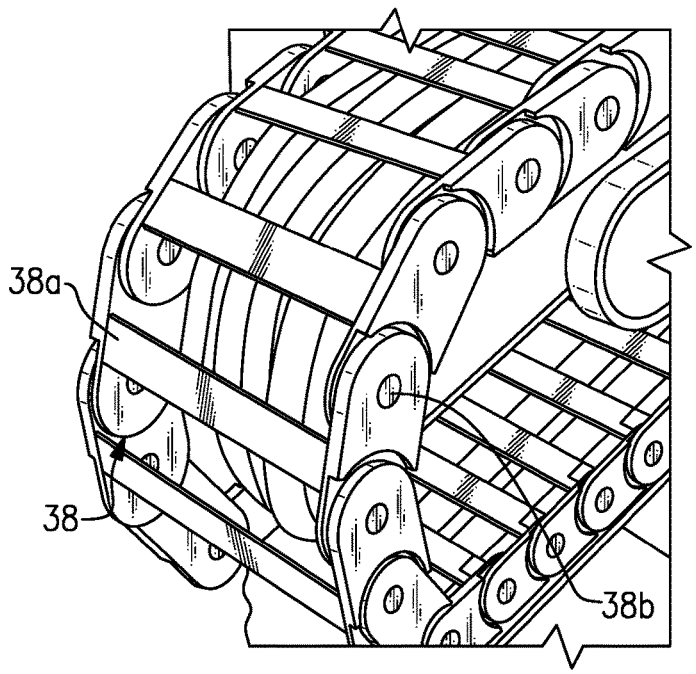
FIG. 2 illustrates an example of a flexible cable track in a solar array.

In this example, the vehicle 20 includes two solar arrays 28a/28b; however, it is to be understood that the vehicle 20 may alternatively have a single solar array or may include additional solar arrays. Each solar array 28a/28b includes solar cells 32 (i.e., photovoltaic cells) mounted on a support structure 34. For instance, the support structure 34 includes a cell deployment system 36 and a flexible cable track 38, also shown in FIG. 2. The cell deployment system 36 may include, but is not limited to, a spring and cable system with a retarder for selectively unfolding and folding the solar arrays 28a/28b between stowed and deployed positions. In a fully stowed position, the solar arrays 28a/28b are rolled-up in a tubular configuration. In a partially or fully deployed position the solar arrays 28a/28b are partially or fully unrolled for solar exposure. The flexible cable track 38 includes a series of links 38a and pivots 38b that rotatably couple the ends of the links 38a together. Each link 38a is thus rotatable relative to the immediately adjacent links 38a such that the flexible cable track 38 can roll over itself between cable track stowed and deployed positions. The flexible cable track 38 also supports one or more cables that are connected to the solar cells 32.

In this example, a controller 40 is disposed in the vehicle body 22 for selectively deploying and stowing the solar arrays 28a/28b. The controller 40 may include software, hardware, or both that may be programmed according to this disclosure. Additionally or alternatively the controller 40, or portions thereof, may be ground-based and may communicate with the vehicle 20 via radio waves.

Figure 3:
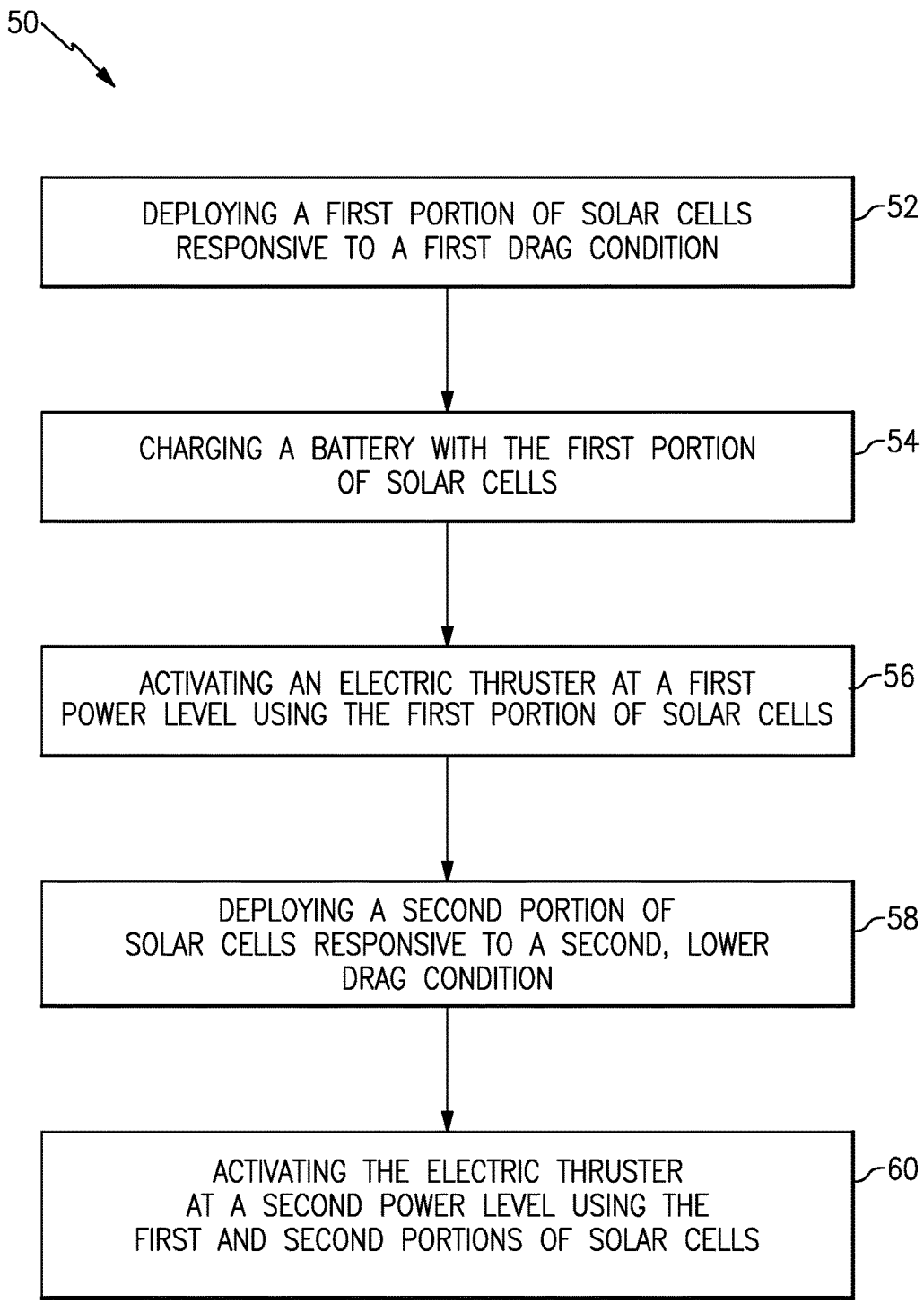
FIG. 3 illustrates an example method of deploying a solar array.

Generally, solar arrays on a space vehicle have a large surface area and produce considerable drag. Drag is especially challenging with use of electric thrusters at low Earth orbits up to approximately 250 to 300 miles altitude. At high levels of drag, low thrust electric thrusters have difficulty maneuvering the spacecraft and/or consume too much power to be practical. However, the vehicle 20 may be used with a method 50 of deploying a solar array as shown in FIG. 3, to selectively deploy a solar array to reduce power requirements. As an example, the controller 40 may be configured to control the vehicle to perform the method 50.

At 52, the method 50 includes deploying a first portion of the solar cells 32 responsive to a first drag condition. The term "portion" refers to one of a plurality of solar cells 32 disposed in one of a string, a roll, a panel, a strand or other structure. For example, a portion of the solar cells 32 of one or both of the solar arrays 28a/28b are deployed, or unrolled, such that the deployed solar cells 32 can generate solar power. The first drag condition may be a drag condition associated with a low altitude, such as low Earth orbit. The solar power generated by the portion of the solar cells 32 is used at 54 to charge the battery 26. As will be appreciated, the number of solar cells 32 deployed may be selected based on the amount of drag and the amount of desired power to be generated to achieve one or more target electrical functions, such as producing thrust. The amount of drag may be calculated or estimated based on data such as altitude, vehicle size, and solar array size. The method 50 may use a drag calculation or estimation directly or may use other data that is representative of drag.

At 56, the first portion of solar cells 32 or the charged battery 26 activate the electric thruster 24 at a first power level to produce thrust. The produced electrical power may be used for onboard electronics, or to activate the electric thruster 24 to provide attitude control or station-keeping, but more typically will be used for orbit raising of the vehicle 20. At 58, a second portion of the solar cells 32 are additionally deployed responsive to a second, lower drag condition. The deployment of the second portion of the solar cells 32 may be the full deployment of the solar arrays 28a/28b or may be an intermediate deployment short of full deployment. The second drag condition may be a drag condition associated with a higher altitude. Thus, the solar array or arrays 28a/28b are only partially deployed at the first, higher drag condition to generate some power yet avoid drag penalty and reduce energy loss due to drag, and are more fully deployed at the second, lower drag condition where there is less drag penalty. At 60, the electric thruster 24 is then activated at a second, higher power level using the first and second portions of the solar cells 32. For example, at the second power level the thruster 24 may provide a higher thrust than at the first power level.

The drag conditions may alternatively be associated with factors other than altitude. For instance, the solar arrays 28a/28b may track the position of the sun. The solar arrays 28a/28b may produce less drag when oriented edge-on with respect to the direction of movement of the vehicle 20 than when oriented face-on. Thus, one or both of the solar arrays 28a/28b may be partially deployed at 52 in response to a high drag condition associated with a face-on orientation and may be more fully deployed at 58 in response to a low drag condition associated with an edge-on orientation.

As can be appreciated, the deployment of the solar cells 32 can be an incremental deployment between only a partial deployment and a full deployment. Alternatively, there may be additional increments of partial deployment associated with changing drag conditions. For instance, there may be two or more partial deployments prior to full deployment as drag diminishes with increasing altitude and/or changing solar array orientations. In another alternative, the deployment may be continuous between two partial deployments or between a partial deployment and full deployment, as a function of altitude or array orientation. Thus, altitude or orientation may serve as a surrogate for use of an actual drag calculation or estimation.

Figure 4:
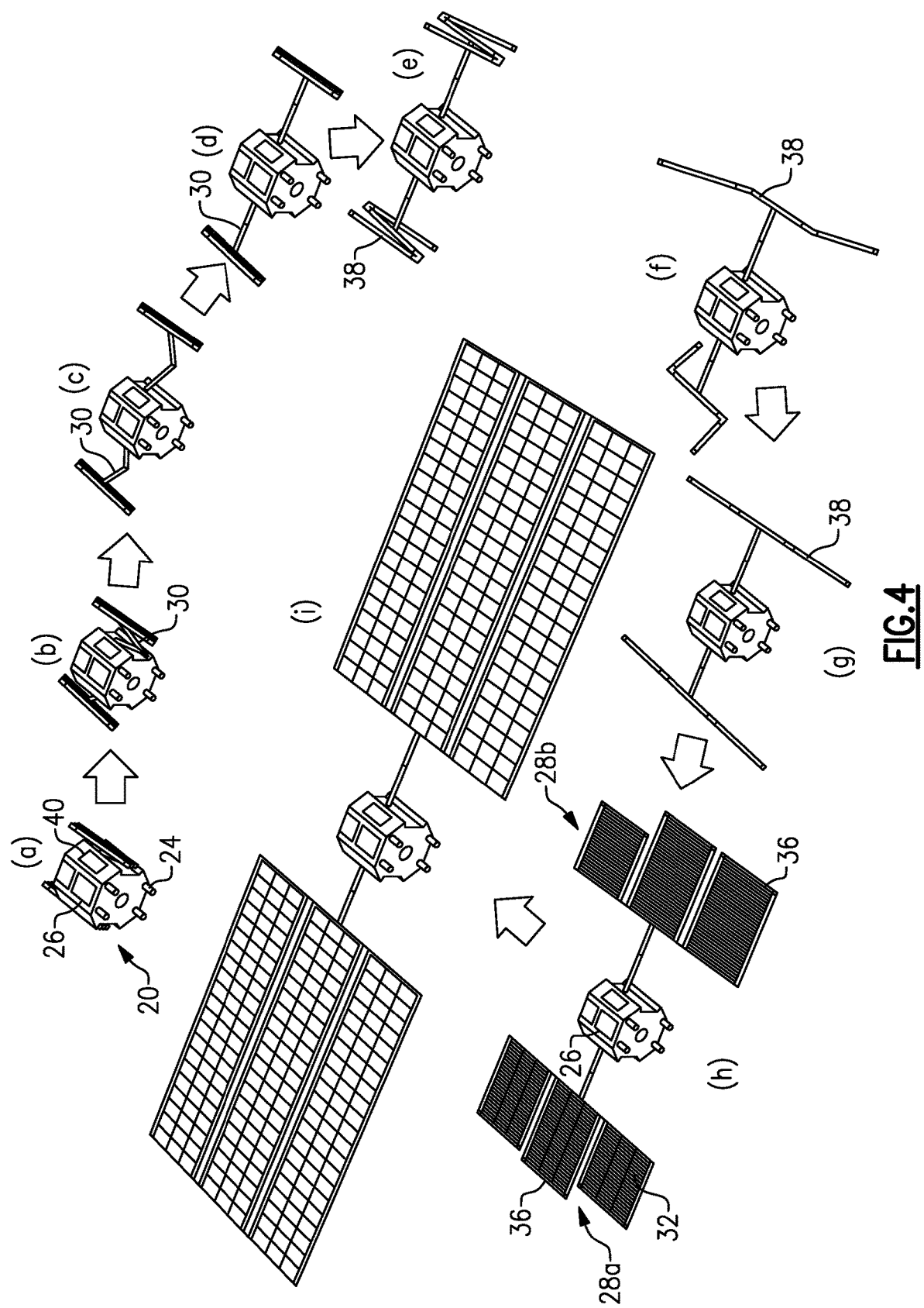
FIG. 4 illustrates a vehicle through various stages of deployment of solar arrays.

FIG. 4 illustrates the vehicle 20 through various stages (a)-(i) of solar array deployment. The vehicle 20 is shown initially at (a) in a fully stowed position, such as after deployment of the vehicle 20 from a launch vehicle. At steps (b), (c), and (d), the arms 30 extend to a fully deployed arm position. At steps (e), (f), and (g) the flexible cable tracks 38 unfold to a fully deployed cable track position. At step (h) the cell deployment system or systems 36 partially deploys, or unrolls, the solar cells 32 of the solar arrays 28a/28b (52 in method 50). At this stage the solar cells 32 may be used to generate power to charge the battery 26 (54 of method 50), followed by either using the charged battery 26 or the solar cells 32 to activate the electric thruster 24 to produce thrust (56 of method 50). At step (i) the cell deployment system or systems 36 fully or more fully deploy the solar cells 32 of the solar arrays 28a/28b (58 of method 50). As can be appreciated, steps (a)-(g) may optionally be a part of the method 50.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method for solar array deployment, the method comprising:
   deploying a first portion of solar cells of a solar array responsive to a first drag condition;
   charging a battery with the first portion of solar cells;
   activating an electric thruster at a first power level using the first portion of solar cells;
   deploying a second portion of solar cells of the solar array responsive to a second drag condition, wherein the second drag condition is lower than the first drag condition; and
   activating the electric thruster at a second power level using the first portion of solar cells and the second portion of solar cells, wherein the second power level is higher than the first power level.

2. The method as recited in claim 1, further comprising raising an orbit of a vehicle attached to the solar array using the electric thruster, and the deploying of the second portion of solar cells is after the raising.

3. The method as recited in claim 1, wherein the first drag condition is at a first altitude and the second drag condition is at a second, higher altitude.

4. The method as recited in claim 1, wherein the deploying of the first portion of solar cells and the deploying of the second portion of solar cells include unfolding the solar array.

5. The method as recited in claim 1, wherein the deploying of the first portion of solar cells includes unrolling the solar array.

6. A vehicle with a solar array, comprising:
   a vehicle body including an electric thruster and a battery operable to activate the electric thruster to produce thrust;
   a solar array attached to the vehicle body; and
   a controller configured to deploy a first portion of solar cells of the solar array responsive to a first drag condition to charge the battery with the first portion of solar cells, activate the electric thruster at a first power level using the first portion of solar cells, deploy a second portion of solar cells of the solar array responsive to a second drag condition that is lower than the first drag condition, and activate the electric thruster at a second power level using the first portion of solar cells and the second portion of solar cells, wherein the second power level is higher than the first power level.

7. The vehicle as recited in claim 6, wherein the controller is configured to raise an orbit of the vehicle body using the electric thruster and then deploy the second portion of solar cells.

8. The vehicle as recited in claim 6, wherein the first drag condition is at a first altitude and the second drag condition is at a second, higher altitude.

9. The vehicle as recited in claim 6, wherein the solar array is moveable between stowed and deployed positions, and the solar array is rolled in the stowed position.

10. The vehicle as recited in claim 6, wherein the vehicle body is a satellite.

11. The vehicle as recited in claim 6, wherein the controller is mounted in the vehicle body.

12. The vehicle as recited in claim 6, wherein the first portion of solar cells deploys by unrolling.

13. A method for solar array deployment, the method comprising:
    deploying a first portion of solar cells of a solar array;
    charging a battery with the first portion of solar cells;
    activating an electric thruster at a first power level using the first portion of solar cells;
    raising an orbit of a vehicle attached to the solar array;
    deploying a second portion of solar cells of the solar array after raising the orbit of the vehicle; and
    activating the electric thruster at a second power level using the first portion of solar cells and the second portion of solar cells, wherein the second power level is higher than the first power level.

14. The method as recited in claim 13, wherein the deploying of the first portion of solar cells is responsive to a first drag condition and the deploying of the second portion of solar cells is responsive to a second, lower drag condition.

15. The method as recited in claim 13, wherein the deploying of the first portion of solar cells and the deploying of the second portion of solar cells includes unfolding the solar array.

16. The method as recited in claim 13, wherein the deploying of the first portion of solar cells includes unrolling the solar array.

* * * * *